US011094226B2

(12) United States Patent
Yasuda et al.

(10) Patent No.: US 11,094,226 B2
(45) Date of Patent: Aug. 17, 2021

(54) RESIN MOLDING

(71) Applicant: SEIKOH GIKEN CO., LTD., Chiba (JP)

(72) Inventors: Takashi Yasuda, Chiba (JP); Masahide Hioki, Chiba (JP); Norihiro Kakinuma, Chiba (JP)

(73) Assignee: SEIKOH GIKEN CO., LTD., Matsudo (JP)

( * ) Notice: Subject to any disclaimer, the term of this patent is extended or adjusted under 35 U.S.C. 154(b) by 231 days.

(21) Appl. No.: 15/472,677

(22) Filed: Mar. 29, 2017

(65) Prior Publication Data
US 2017/0287367 A1 Oct. 5, 2017

(30) Foreign Application Priority Data

Mar. 31, 2016 (JP) .............................. JP2016-071076
Nov. 10, 2016 (JP) .............................. JP2016-219880

(51) Int. Cl.
| G09F 7/00 | (2006.01) |
| B44D 5/10 | (2006.01) |
| B44F 9/02 | (2006.01) |
| B44F 9/10 | (2006.01) |

(52) U.S. Cl.
CPC ................. *G09F 7/00* (2013.01); *B44D 5/10* (2013.01); *B44F 9/02* (2013.01); *B44F 9/10* (2013.01)

(58) Field of Classification Search
CPC ..... G09F 7/00; B44D 5/10; B44F 9/02; B44F 9/10; B32B 3/26; B32B 3/263; B32B 3/30; Y10T 428/24058; Y10T 428/24066; Y10T 428/24074; Y10T 428/24116; Y10T 428/24132; Y10T 428/24174; Y10T 428/24355; Y10T 428/24405; Y10T 428/24438; Y10T 428/24479; Y10T 428/24504; Y10T 428/24537;
(Continued)

(56) References Cited

U.S. PATENT DOCUMENTS 4,033,059 A 7/1977 Hutton
5,991,078 A * 11/1999 Yoshitake ............ G02B 5/1857
359/22
(Continued)

FOREIGN PATENT DOCUMENTS

JP 49043718 A2 4/1974
JP 3127285 11/2006
(Continued)

*Primary Examiner* — Megha M Gaitonde
(74) *Attorney, Agent, or Firm* — United IP Counselors, LLC

(57) ABSTRACT

A resin molding is provided. The resin molding includes an optically transparent plate-shaped portion, which has a first surface having a smooth surface portion, and a second surface having plural sections, wherein each of the plural sections has a width and includes one or more convex portions which have one or more ridge lines extending in a ridge line direction. The ridge line direction of the one or more convex portions of at least one of the plural sections is different from the ridge line direction of the one or more convex portions of one or more of others of the plural sections. When the first surface of the resin molding is observed from outside, the resin molding has metallic appearance.

8 Claims, 11 Drawing Sheets

(58) Field of Classification Search
CPC ....... Y10T 428/2457; Y10T 428/24587; Y10T 428/24942; Y10T 428/2495
USPC ........ 428/105, 106, 107, 112, 114, 119, 141, 428/147, 151, 156, 159, 163, 167, 169, 428/212, 213
See application file for complete search history.

(56) References Cited

U.S. PATENT DOCUMENTS

| | | | |
|---|---|---|---|
| 6,759,965 B1 * | 7/2004 | Hatjasalo | G09F 13/04 116/216 |
| 9,256,007 B2 * | 2/2016 | Vasylyev | G03B 21/208 |
| 2007/0091617 A1 * | 4/2007 | Couzin | G02B 5/021 362/341 |
| 2007/0128748 A1 | 6/2007 | Leung Ki | |
| 2016/0178916 A1 | 6/2016 | Kakinuma | |

FOREIGN PATENT DOCUMENTS

| | | |
|---|---|---|
| JP | 4261957 | 5/2009 |
| JP | 4748470 B2 | 8/2011 |
| JP | 5594641 B1 | 9/2014 |
| JP | 5798233 B1 | 10/2015 |

\* cited by examiner

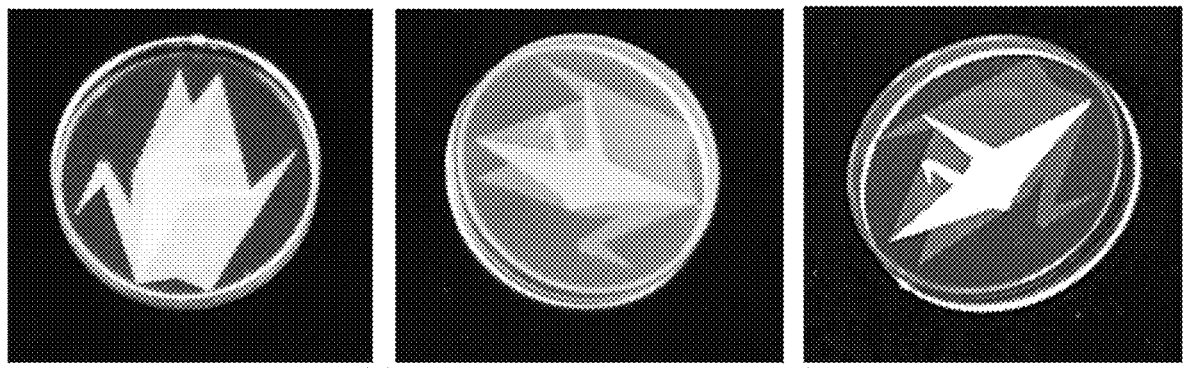
FIG.12A  FIG.12B  FIG.12C
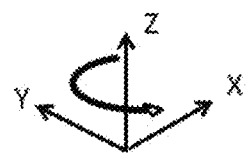

RESIN MOLDING

BACKGROUND

Technical Field

This disclosure relates to a resin molding (i.e., molded resin article), and particularly relates to a decorative resin molding which has metallic appearance even though coating, plating or the like is not performed thereon.

Description of the Related Art

Since resin can be molded so as to have a desired shape, resin is used for a variety of daily necessities. By subjecting such a resin molding to a secondary processing such as coating and plating, the resin molding can have metallic appearance, and therefore quality appearance can be imparted to the resin molding, thereby enhancing the commercial value thereof.

Japanese patents Nos. 4,748,470 and 5,798,233 have disclosed techniques of imparting metallic appearance to a resin molding (i.e., techniques of decorating a resin molding).

In addition, Japanese patents Nos. 4,261,957 and 5,594,641, and Japanese utility model registration No. 3,127,285 have disclosed techniques by which metallic appearance cannot be imparted to a resin molding but by which appearance of a resin mold can be changed by forming convex and concave portions on the light entrance surface of the resin molding to form a decorative pattern. By changing the angle of viewing or lighting the resin molding, a light portion and a dark portion of the resin molding move or appearance of the pattern changes. Namely, decorative resin moldings having a special design (i.e., fresh taste) such that patterns change when changing the viewing angle or the lighting angle have been disclosed thereby.

However, the technique disclosed by Japanese patent No. 4,748,470 relates to a decorative resin molding which has a vapor-deposited film including two or more kinds of metals on the surface thereof, and therefore it is necessary to use two or more kinds of metal materials in addition to the resin material used for the resin molding for producing the decorative resin molding. In addition, since it is necessary for the technique to perform a deposition process, the production process is complicated and the production costs increases.

The technique disclosed by Japanese patent No. 5,798,233 dissolves the problems of the technique disclosed by Japanese patent No. 4,748,470, and imparts metallic appearance to a resin molding by utilizing total reflection without depositing a metal on the surface of the resin molding. However, the technique has a problem such that the resultant resin molding does not necessarily have metallic appearance because total reflection does not necessarily occur depending on the viewing angle. In addition, the technique has another problem such that patterns do not have three dimensional appearance or shade and therefore the patterns tend to be monotonous.

In order to broaden the range of viewing angle in which the resin molding has metallic appearance, Japanese patent No. 5,798,233 discloses another technique such that convex and concave portions having a pyramid structure such as quadrilateral structure are formed on the surface of the resin molding so that the convex and concave portions cause total reflection. However, the resin molding has an appearance like clouded crimped surface, namely, the resin molding has relatively low metallic glossiness (i.e., low brightness). In addition, the technique also has the problem such that patterns do not have three dimensional appearance or shade and therefore the patterns tend to be monotonous because appearance of the decorative patterns does not change depending on the viewing angle or lighting angle.

Resin moldings produced by the techniques disclosed by Japanese patents Nos. 4,261,957 and 5,594,641, and Japanese utility model registration No. 3,127,285 cannot impart metallic appearance to the resin molding, and it is necessary for the techniques to perform printing or coting as a previous process or a post process. Namely, the resin moldings cannot be produced only by casting. However, appearance of the decorative patterns changes when the viewing angle or lighting angle is changed, and therefore the resultant resin moldings have a fresh taste which is an additional value for the resin moldings.

For these reasons, we recognize that there is a need for a decorative resin molding which can be produced without complicating the production process while preventing increase of production costs and which can produce an effect such that observers can recognize decorative metallic patterns on the molding while appearance of the patterns changes when the viewing angle or the lighting angle is changed.

SUMMARY

As an aspect of the present invention, a resin molding including an optically transparent plate-shaped portion is provided. The plate-shaped portion has a first surface having a smooth surface portion, and a second surface having plural sections, wherein each of the plural sections has a width and includes one or more convex portions which have one or more ridge lines extending in a ridge line direction. The ridge line direction of the one or more convex portions of at least one of the plural sections is different from the ridge line direction of the one or more convex portions of one or more of others of the plural sections. When the first surface of the resin molding is observed from outside, the resin molding has metallic appearance.

BRIEF DESCRIPTION OF THE SEVERAL VIEWS OF THE DRAWINGS

FIGS. 12A, 12B and 12C are photographs of an example of the decorative resin molding whose appearance changes when the viewing angle (shooting angle) is changed.

DETAILED DESCRIPTION

Figure 1:
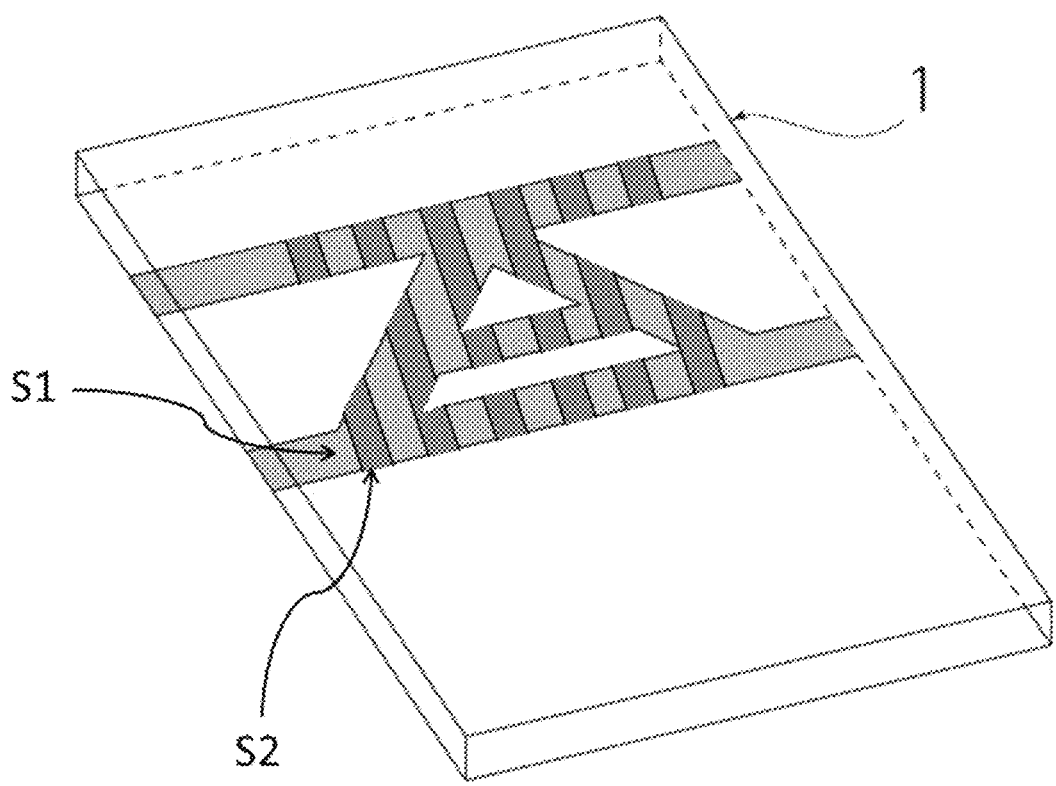
FIG. 1 is a schematic view illustrating a decorative resin molding according to an embodiment of the present invention.

The purpose of the present invention is to provide a decorative resin molding which can be produced without complicating the production process while preventing increase of production costs and which can produce an effect such that observers can recognize decorative metallic patterns on the molding while appearance of the patterns change when the viewing angle or the lighting angle is changed.

The resin molding of the present invention includes an optically transparent plate-shaped portion. The plate-shaped portion has a first surface having a smooth surface portion and a second surface having plural sections, each of which has a width and includes convex portions. The ridge lines of convex portions extend in the same ridge line direction in each section. The ridge line direction of at least one of the plural sections is different from the ridge line direction of one or more of the other sections. At least part of light entering from the first surface causes total reflection at the inclined opposite surfaces of the at least one convex portion or adjacent convex portions of the plural convex portions in the plural sections, thereby causing total reflection of light toward the first surface which is the outer surface of the resin molding, resulting in impartment of metallic appearance (metallic-color-like appearance) to the resin molding.

In addition, since the plural sections on the second surface include at least one section whose convex portions have a ridge line direction different from the ridge line direction of the convex portions of one or more of the other plural sections, the range of angle in which total reflection caused by the section toward the first surface is different from the range of angle of total reflection in the other sections, thereby changing the metallic appearance of the molding when the viewing angle or the lighting angle is changed. In this regard, the ridge line means the line of a ridge between a peak and another peak (like adjacent mountains), and therefore the height of the ridge line may change in the direction of the ridge line.

In the above description, each of the sections includes plural convex portions. However, it is possible for each of the sections to have only one convex portion.

In addition, the shape of the convex portion is not particularly limited, and the convex portion can have a linear outline or a curved outline (such as hemispherical convex portion).

In this resin molding, the angle between the direction of the ridge line of the convex portions in the at least one of the plural sections and the direction of the ridge line of the convex portions in another of the plural sections is not particularly limited (i.e., is not necessarily 90°). In addition, the ridge line is not limited to straight line and may be a curved line. Further, the ridge lines may be curved. For example, when the convex portion is cut along the X-Y plane, the ridge line may be curved on the X-Y plane. In addition, when the convex portion is cut along the X-Z (or Y-Z) plane, the ridge line(s) may be curved, and the directions of the ridge lines may be different from each other in the Z-direction.

In this resin molding, the height of the ridge lines of the convex portions in one section on the second surface may be the same or different from the heights of the convex portions in the other sections. In addition, the heights of the convex portions in one section may be the same or different from each other.

In addition, at least one of the first and second surfaces may be a curved surface.

In this resin molding, the second surface can include a smooth and optically transparent portion other than the plural sections having convex portions, wherein the transparent portion does not include convex portions and has a shape such as characters, figures, signs, pictures, designs or the like (hereinafter these are sometimes referred to as patterns). In this regard, the transparent portion of the resin molding can display patterns. In addition, the interfacial portion between two adjacent sections may be a curved line or may display a pattern (such as the characters, figures, signs, pictures and designs mentioned above), which looks differently due to total reflection caused by convex portions when the viewing angle or the lighting angle is changed.

Hereinafter embodiments of the present invention will be described in detail by reference to drawings. However, the present invention is not limited to the embodiments and examples mentioned below, and embodiments and examples other than those mentioned below are possible in the present invention.

A preferred embodiment of the present invention will be described in detail by reference to drawings attached. In this regard, the sizes, materials, specific numerical numbers, etc. described in the embodiment are used for the purpose of illustration only and are not intended to be limiting unless otherwise specified. In addition, in the following specification and the drawings attached, elements having substantially the same function and constitution have the same reference number to avoid overlap in description. Further, elements which do not directly relate to the present invention are not illustrated in the drawings.

Figure 2:
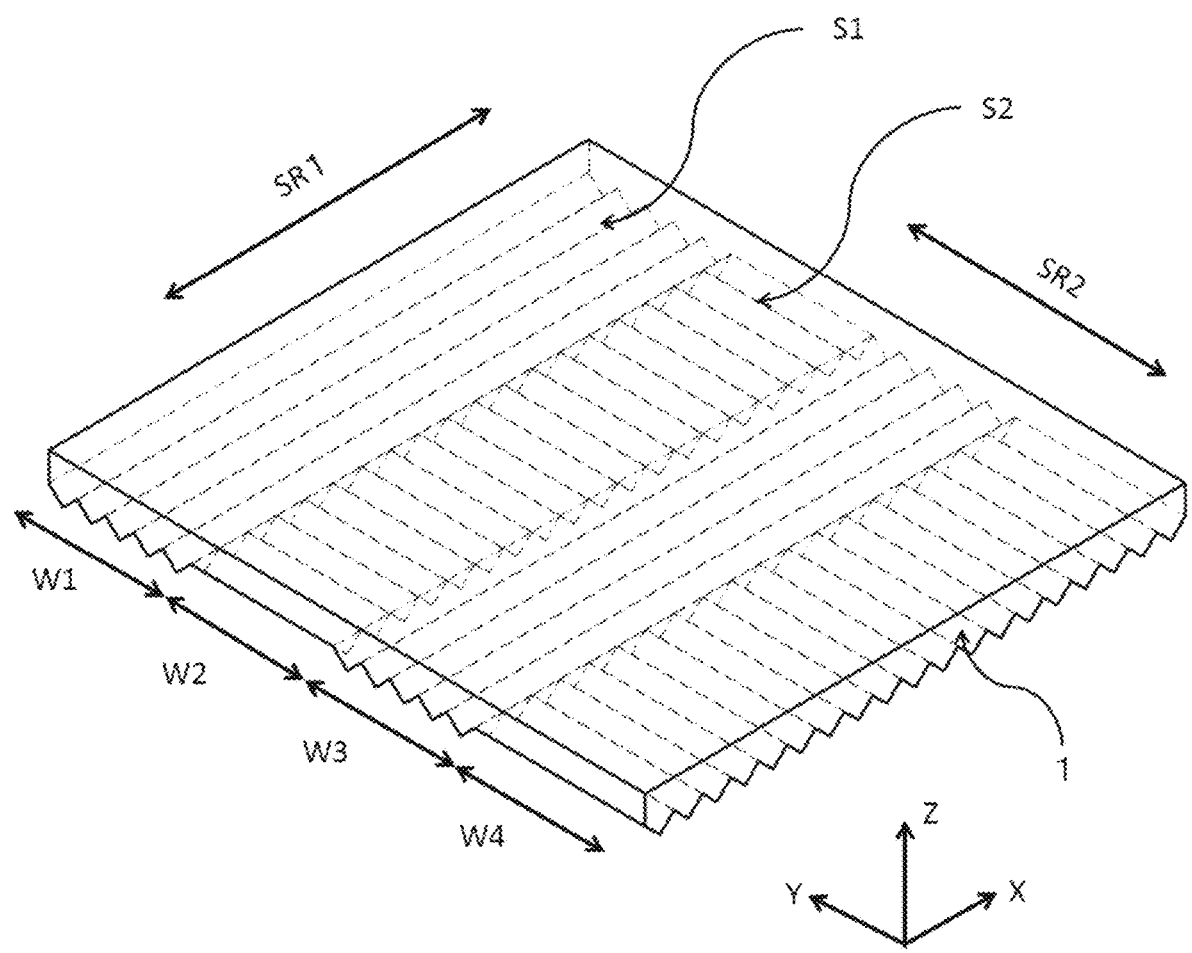
FIG. 2 is a perspective view illustrating a plate-shaped portion of the decorative resin molding.
Figure 3:
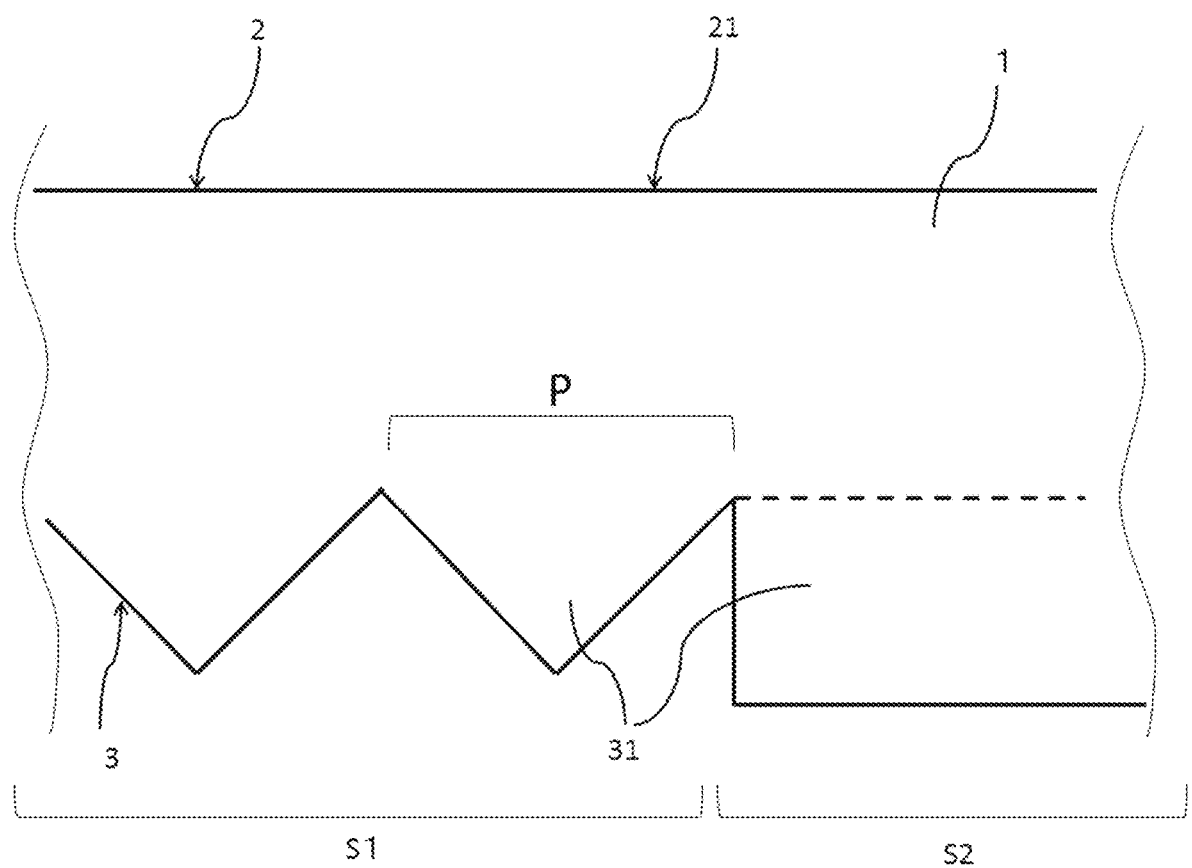
FIG. 3 is a cross-sectional view illustrating a portion of the plate-shaped portion illustrated in FIG. 2.

FIG. 1 is a schematic view illustrating a decorative resin molding 1 (hereinafter sometimes referred to molding 1) according to an embodiment of the present invention. FIG. 2 is a schematic perspective view of a plate-shaped portion of the molding 1. FIG. 3 is a schematic cross-sectional view of the plate-shaped portion illustrated in FIG. 2. In FIGS. 1-3, characters S1 and S2 respectively represent a first section and a second section; characters SR1 and SR2 respectively represent a direction of a ridge line (hereinafter sometimes referred to as a ridge line direction) of a convex portion in the first section S1, and a ridge line direction of a convex portion in the second section S2; and characters W1 and W2 respectively represent a width of the first section S1, and a width of the second section S2. Characters W3 and W4 respectively represent widths of third and fourth sections. Characters X, Y and Z respectively represent directions.

Specifically, the molding 1 is a resin molding which includes an optically transparent plate-shaped portion composed of a single material and which can have metallic appearance. Referring to FIG. 3, the molding 1 includes a first surface 2 having a smooth surface 21, and a second surface 3 on which plural convex portions 31 are formed. In this regard, the term "single material" means a material which is at least optically transparent (hereinafter sometimes referred to as transparent material or material having transparency) and which can include therein one or more additives such as colorants, antistatic agents, weatherproof agents, and opaque powders, flakes and fibers of metallic substances and nonmetallic substances as long as the material can maintain the transparency.

In addition, the second surface 3 of the molding 1 has plural sections, each of which has a width W and in which plural convex portions 31 having a width P are present, wherein the width W is not smaller than the width P. In this molding 1, the ridge line direction SR1 of the convex portions in the first section S1 is different from the ridge line direction SR2 of the convex portions in the second section S2. The width P is sometimes referred to as a pitch of the convex portions 31.

The shape of the sections is not limited to such a quadrangular shape (or band shape) as illustrated in FIGS. 1 and 2, and includes round shapes, polygonal shapes, and shapes having a free curved outer line (i.e., an area having a free outer line). The width W of the section is defined as the maximum value of the length of the section in a direction (horizontal direction) perpendicular to the ridge line direction of the section. Each of the sections includes at least one groove in the width direction, which groove is formed by the convex portions in the section. Since the width W of the section is defined above, the width (and the minimum width) of a section having a curved outer line or a section having a polygonal shape can be specified, and therefore the width of the section can be compared with widths of other sections. Alternatively, it is possible to compare the area of the section with areas of other sections. In addition, when the ridge line of a first section is a curved line, the adjacent convex portions which have ridge lines having the same center of curvature are defined to be present in the same section, and the length of the section in a direction perpendicular to the ridge line (i.e., the length in the curvature radius direction) is defined as the width W of the section. According to this definition of width, in a section in which plural straight ridge lines extend in parallel, the ridge lines have a infinite curvature radius in the direction perpendicular to the straight ridge lines (i.e., the ridge lines have the same infinite curvature center in the same direction), and therefore the ridge lines are considered to belong to the same section. In contrast, when ridge lines extend radially, the directions of the ridge lines are different from each other, and therefore the portions having the ridge lines are considered to belong to different sections. In addition, when there are plural grooves which are formed by plural convex portions so as to extend in parallel, the convex portions having the ridge lines are considered to belong to the same section if the directions of the ridge lines are the same because the same effect to impart metallic appearance can be produced thereby. In this regard, the depths of the grooves may be different from each other. Since the width direction of a section can be determined by the method mentioned above, it is also possible to determine the ridge line direction of the section from the width direction.

In the molding 1, at least part of light entering from the first surface 2 causes total reflection at the plural convex portions 31 on the second surface 3, and then exits from the first surface 2, resulting in impartment of metallic appearance to the resin molding. In this regard, the term "metallic appearance" means that the molding 1 looks as if the molding has a metallic coating thereon when observed by an observer.

Suitable materials for use as the main component of the molding 1 include resins, i.e., polymers which are optically transparent and which can be processed or molded to have desired shapes. Specific examples of the resins include thermoplastic resins such as polycarbonate (PC), polyethylene (PE), polypropylene (PP), polyvinyl chloride (PVC), polyester (such as polyethylene terephthalate (PET)), acrylic resins (such as polymethyl methacrylate (PMMA)), cycloolefin polymers (COP), cycloolefin copolymers (COC), acrylonitrile-styrene resins (AS), and acrylonitrile-butadiene-styrene resins (ABS); thermosetting resins such as phenolic resins, polyurethane, and thermosetting polyimide; and photocrosslinkable resins, but are not limited thereto as long as the resins have a desired refractive index. The resins used for the molding 1 may have any one of states including a colorless and transparent state, a colorless and semi-transparent state, a colored and transparent state, and a colored and semi-transparent state.

As mentioned above, the plate-shaped portion of the molding 1 has plural sections, each of which is formed on the second surface 3 by the plural convex portions 31. The plural sections may be formed on a surface (such as an inner surface or a side surface) of the convex portions or concave portions. The plate-shaped portion of the molding 1 is not necessarily a parallel plate in which the first surface 2 and the second surface 3 are parallel to each other. Namely, it is possible for the plate-shaped portion that at least one of the first surface 2 and the second surface 3 is a curved surface, a convex surface, a concave surface, a flat surface, or a combination of two or more of these surfaces. In a case where at least one of the first surface 2 and the second surface 3 is a curved surface, convex portions having the same ridge line direction are considered to belong to the same section even though the heights or the depths of the convex portions are different, because the convex portions impart the same metallic appearance to the molding 1 when the molding is observed from a direction.

When plural convex portions are formed by a cutting tool while the cutting tool is scanned in one direction, the resultant convex portions belong to the same section because of having the same ridge line direction. Namely, in a cross-section of the convex portions along a plane perpendicular to the ridge line in a section, when the direction of the center line of the angle formed by a pair of slopes (i.e., facing slopes) of adjacent convex portions is the same as the direction of the center line of the angle formed by a pair of slopes of other adjacent convex portions, these convex portions are considered to belong to the same section.

Figure 4:
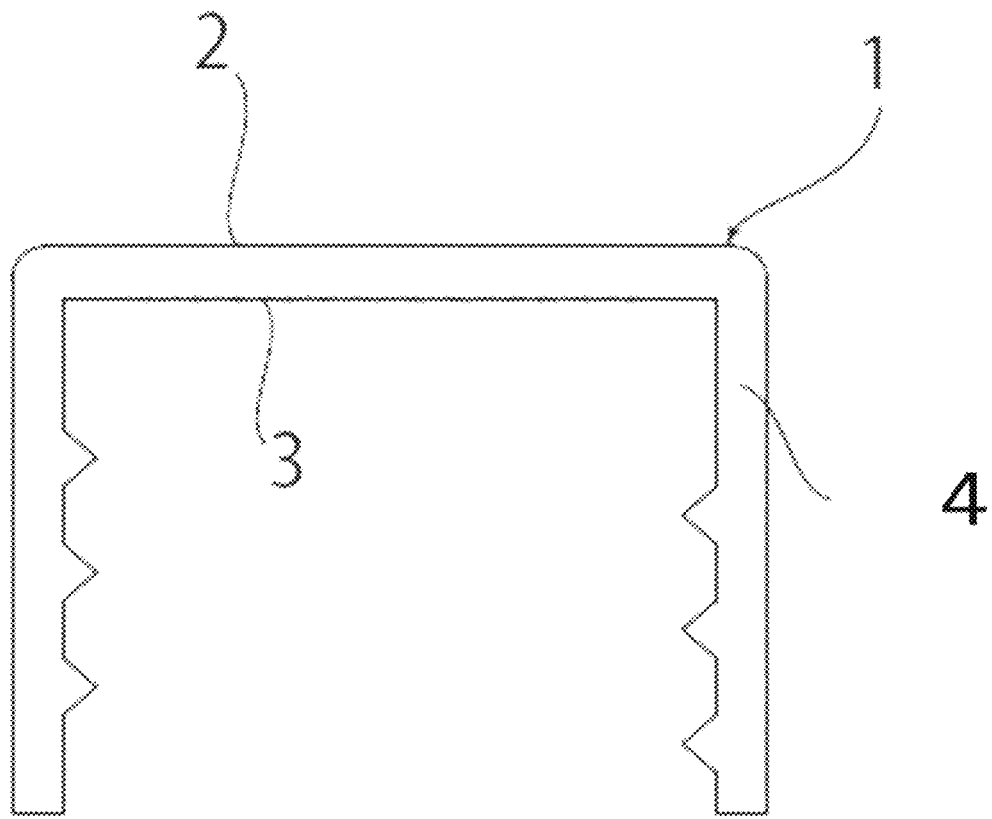
FIG. 4 is a schematic view illustrating an example for which the decorative resin molding is used.

As illustrated in FIG. 4, the molding 1 can be used as a cap of a container such as drink containers and cosmetic containers, wherein numeral 4 denotes a side surface of the cap, which is a curved surface. In addition, the molding 1 can be used for various goods such as static parts such as emblems to be attached to mechanical devices (such as cars), and dynamic parts such as clock hands. Further, a pattern such as wood-effect patterns, traditional East and West patterns can be formed on the molding 1.

In the molding 1, the resin constituting the molding has optical transparency. In this regard, the term "optical transparency" means a property such that at least part of incident light passes through the molding. The transparency of a portion of the plate-shaped portion of the molding 1 on which no convex portion is formed and which is present in the vicinity of a convex portion is preferably higher than 0% and not higher than 60%, and more preferably not lower than 5% and not higher than 50%, against light having a wavelength of 633 nm, but is not limited thereto. When the transparency is higher than 0%, it is possible for incident light to travel in the resin and to be reflected therein, and therefore the molding 1 can give metallic appearance to observers. In this regard, when the transparency is not lower than 5%, this effect can be further enhanced. When the transparency is not higher than 60%, the degree of the metallic appearance can be enhanced, and when the transparency is not higher than 50%, this effect can be further enhanced.

As mentioned above, the molding 1 has the first surface 2 on which the smooth surface 21 is formed. In the molding 1, light enters from the first surface 2 and travels in the resin. In this regard, at least part of incident light causes total reflection in the resin, and then exits from the first surface 2. Therefore, the molding 1 can give metallic appearance to observers. In this regard, it is preferable that the smooth surface has a smoothness similar to that of a mirror surface. However, when the surface has such a property that at least part of light passes through the surface, the effect of the present invention can be produced. Therefore, the first surface 2 may be a curved surface or may have third-dimensional projections, geometric patterns, irregularity, etc. as long as the surface has the property. In addition, it is possible that a material such as colorants is attached to the first surface 2 as long as the surface has the property.

It is possible for the molding 1 to have a structure such that a smooth transparent portion different from the convex (and concave) portions 31 which has a shape such as a character, figure, sign, etc. is arranged in a section so that the transparent portion looks like the character, figure, sign, etc. (i.e., observers recognize the transparent portion as the character, figure, sign, etc.). In addition, it is also possible for the molding 1 to have a structure such that a section of the molding including the convex (and concave) portions 31 has a shape such as a character, figure, sign, etc. so that observers recognize the section as the character, figure, sign, etc. due to total reflection at the convex (and concave) portions 31. Specific examples of such a transparent portion includes an area (such as white areas in FIG. 1) of the second surface 3, on which the sections S1 and S2 (such as gray areas in FIG. 1) are not formed (i.e., on which the convex portions 31 (and concave portions) are not formed).

Figure 5:
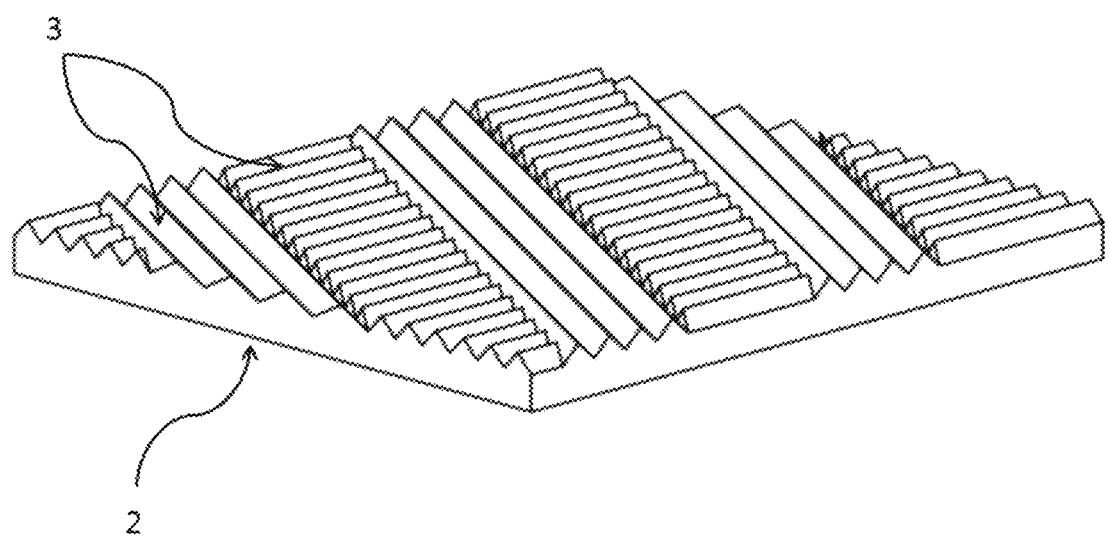
FIG. 5 illustrates an example of combination of a first section and a second section, which includes convex portions having ridge lines whose direction is different from that of the ridge lines of convex portions of the first section.
Figure 6:
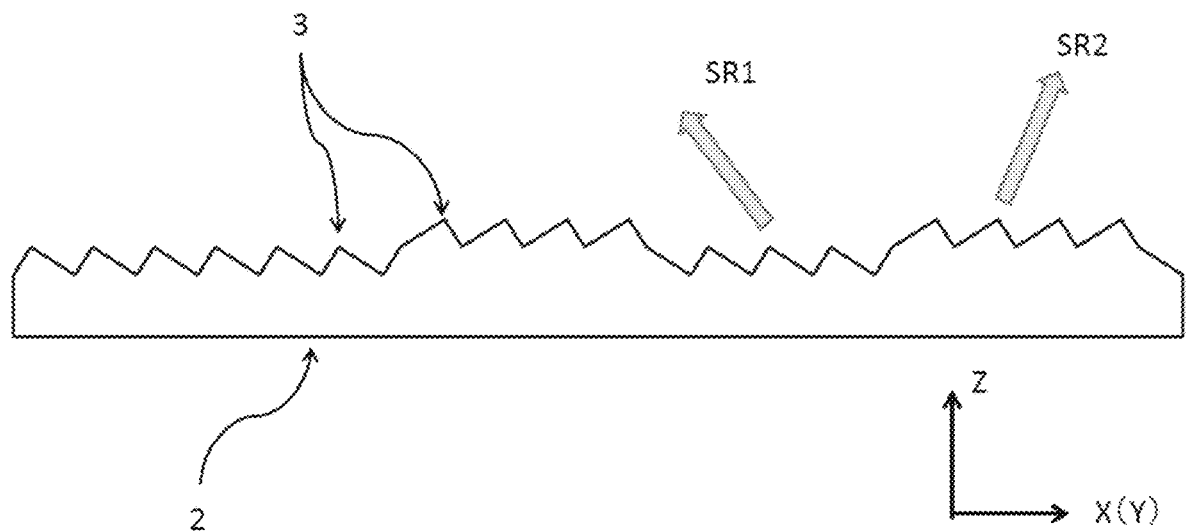
FIG. 6 illustrates an example of convex portions which extend in different directions in the Z-axis direction.

FIG. 5 is a perspective view illustrating a combination of a section (first section) and another section (second section), which includes convex portions having a ridge line direction perpendicular to the ridge line direction of the convex portions of the first section. However, the angle between the ridge line directions is not limited to the right angle. For example, the angle may be angles formed by combinations of a section having curved ridge lines (such as ridge lines having a concentric circle shape (e.g., ridge lines having a concentric circle shape on a hemispherical convex portion) or curved ridge lines having different centers of curvature) and a section having such straight ridge lines as illustrated in FIG. 5, or other combinations. In addition, the width of the sections is not particularly limited (i.e., it is not necessary for the width to change with regularity). For example, when the molding 1 has three different sections on the second surface 3, it is not necessary for the sections to cross at an angle of 120° on the X-Y plane. In addition, as illustrated in FIG. 6, it is possible for the molding that the ridge line directions (such as SR1 and SR2) of the sections are different in the Z-direction (i.e., the direction of the center line of the angle formed by a pair of slopes of other adjacent convex portions is different) even though the convex portions of the sections extend in the same direction in the Z-direction For example, it is possible for the molding to include a section having a ridge line direction (center line direction) which has an angle (for example, +15° relative to the Z-axis) and another section having another ridge line direction which has another angle (for example, −15° relative to the Z-axis). By slanting this molding in the ±X direction or the ±Y direction or by changing the lighting direction in the X or Y direction, the effect of the present invention can be produced.

Figure 7:
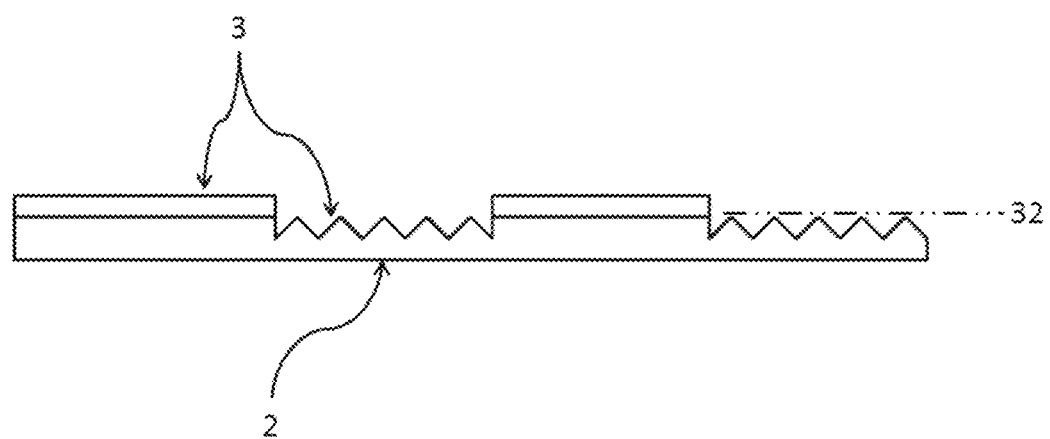
FIG. 7 illustrates convex portions which have different heights.

FIG. 7 is a schematic cross-sectional view illustrating an example of the molding in which the ridge lines of a section have a height different from the height of the ridge lines of another section, wherein numeral 32 denotes a level of the top of the convex portions of the lower section. Such a molding can also produce the same effect. When a molding having such a structure as illustrated in FIG. 7 is prepared by cutting a molded resin or using a die in which a portion of the die corresponding to a convex portion of the molding is formed by cutting, the molding has an advantage such that the molding or the die can be easily prepared (i.e., the convex portions can be formed by one scanning of the cutting tool) while preventing occurrence of a problem such that when convex portions of a section are formed by cutting, the convex portions of the adjacent section are damaged by the cutter. In this regard, the preferable difference in height between convex portions of adjacent sections is the following.

Specifically, when convex portions (referred to as second convex portions) are formed by moving a cutting tool in the X-direction or Y-direction (i.e., horizontal direction in FIG. 7) to form a second section in the vicinity of a first section in which first convex portions having a different ridge line direction are already formed, it is preferable that there is a difference in height between the ridge lines of the second convex portions and the ridge lines of the first convex portions so that the tip of the cutting tool does not interfere with the ridge lines of the first convex portions. In addition, when there are two separated sections (referred to as first and second sections) with a section (third section) therebetween wherein the ridge lines of convex portions of the second section are present on the extended lines of the ridge lines of the convex portions of the first sections and the ridge lines of the convex portions of the third section have a ridge line direction different from that of the convex portions of the first and second sections, the convex portions of the first and second sections can be prepared by one scanning of the cutting tool without causing a problem in which the cutting tool interferes with the tops of the convex portions of the third section. In this regard, this advantage can also be taken even when the third section is present at a position separate from the first and second sections instead of the intermediate position between the first and second sections. By using this cutting method, a molding having plural sections, in which minute convex portions having fine ridge lines are formed wherein the ridge lines of separated sections are present on the extended lines thereof as mentioned above, can be easily prepared. In addition, by using this method, it is not necessary to move a cutting tool up and down in the Z-axis direction when the ridge lines are prepared by the cutting tool, and therefore the time needed for cutting a large surface of a molding can be shortened. Namely, the production method has an advantage.

In the molding mentioned above which have the first and second sections having different heights, it is more preferable from the viewpoint of processability that the valley (i.e., bottom) formed by two adjacent convex portions of the second section (i.e., the deepest valley) is higher in level than the top of the convex portions (highest convex portions) of the first section which is lower in level than the second section and in which the convex portions have a ridge line direction different from the ridge line direction of the convex portions of the second section. In this regard, even when the cutting tool used interferes with the ridge lines of the convex portions of the first section to some extent, an effect similar to the effect of the present invention can be produced.

Figure 8A:
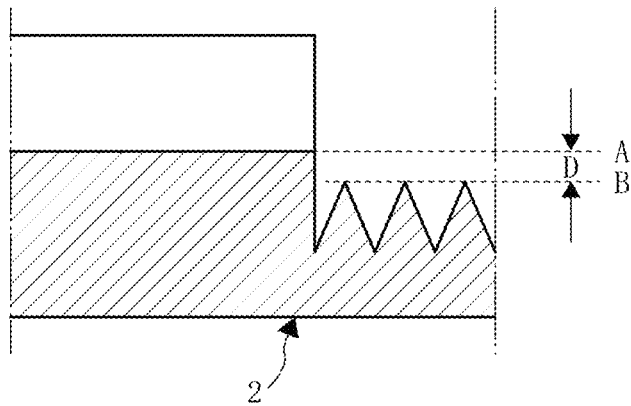
FIGS. 8A, 8B and 8C illustrate examples of the first and second sections which have different height difference.
Figure 8B:
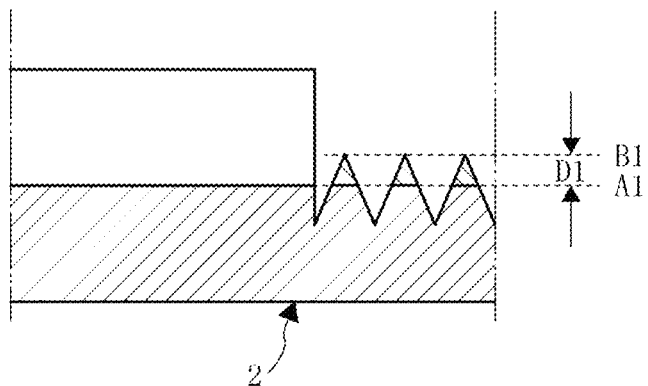
Figure 8C:
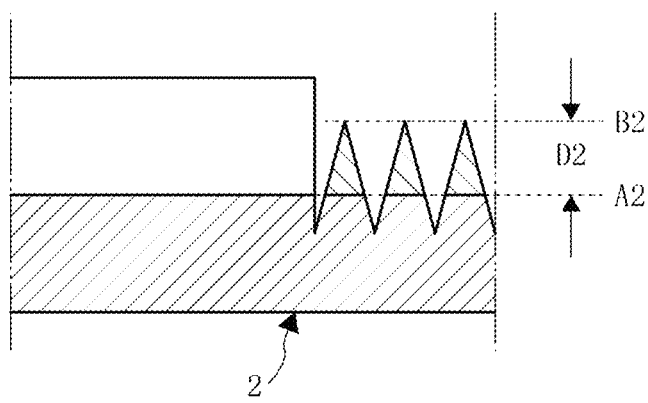

The height difference will be described in detail. FIGS. 8A, 8B and 8C illustrate examples of the first and second sections which have different height difference. In FIGS. 8A, 8B and 8C, characters A (and A1 and A2), B (and B1 and B2) and D (and D1 and D2) respective denote a level of the valley (bottom) of the second section, a top of the convex portions (highest convex portions) of the first section, and a difference in height (height difference) between the valley of the second section and the top of the convex portions of the first section.

In the molding illustrated in FIG. 8A, the level of the valley of the second section is higher in level by D than the top of the convex portions of the first section. Therefore, when the second section is formed by a cutting tool, the cutting tool does not interfere with the convex portions of the first section.

In contrast, in the molding illustrated in FIG. 8B, the level of the valley of the second section is lower in level by D1 than the top of the convex portions of the first section. In this regard, the height difference D1 is ⅓ of the height of the convex portions of the first section. Therefore, when the second section is formed by a cutting tool, it is possible that the upper ⅓ portion of the convex portions of the first section is cut. Even in this case, the metallic appearance effect caused by total reflection can be produced by the molding.

In the molding illustrated in FIG. 8C, the level of the valley of the second section is lower in level by D2 than the top of the convex portions of the first section. In this regard, the height difference D2 is ⅗ of the height of the convex portions of the first section. Therefore, when the second section is formed by a cutting tool, it is possible that the upper ⅗ portion of the convex portions of the first section is cut. Even in this case, the metallic appearance effect caused by total reflection can be produced by the molding. Namely, even when the valley formed by the two adjacent convex portions of the second section is lower in level than the top of the convex portions of the first section by ⅗ of the height of the convex portions of the first section and therefore the upper ⅗ of the convex portions is cut (in this case, the convex portion has a trapezoidal cross section), the trapezoidal convex portion can reflect light entering the convex portion in an amount of 40% (i.e., 1⅗) of the amount of light reflected by a (uncut) convex portion having a triangular cross section. In this regard, when the convex portion can reflect light entering the convex portion in an amount of 40% or more (i.e., when the light transmission of the convex portion is controlled to be not greater than 60%), observers (human eyes) can recognize a metallic pattern (formed by the convex portion) on the molding. Therefore, even in the molding illustrated in FIG. 8C, the metallic appearance effect can be produced by the molding.

If it is desired to enhance the optical transparency of the molding 1, this structure (cut convex portions) is optionally used.

When plural convex portions are formed in parallel in a section, the heights of the convex portions and the depths of the valleys formed by the convex portions may be different from each other. Even in this molding, the ridge lines of the convex portions have the same direction, and therefore the area including the convex portions can produce the same metallic appearance effect similar to the effect of the present invention. Therefore, the area including the convex portions is considered to be present in the same section.

Figure 9:
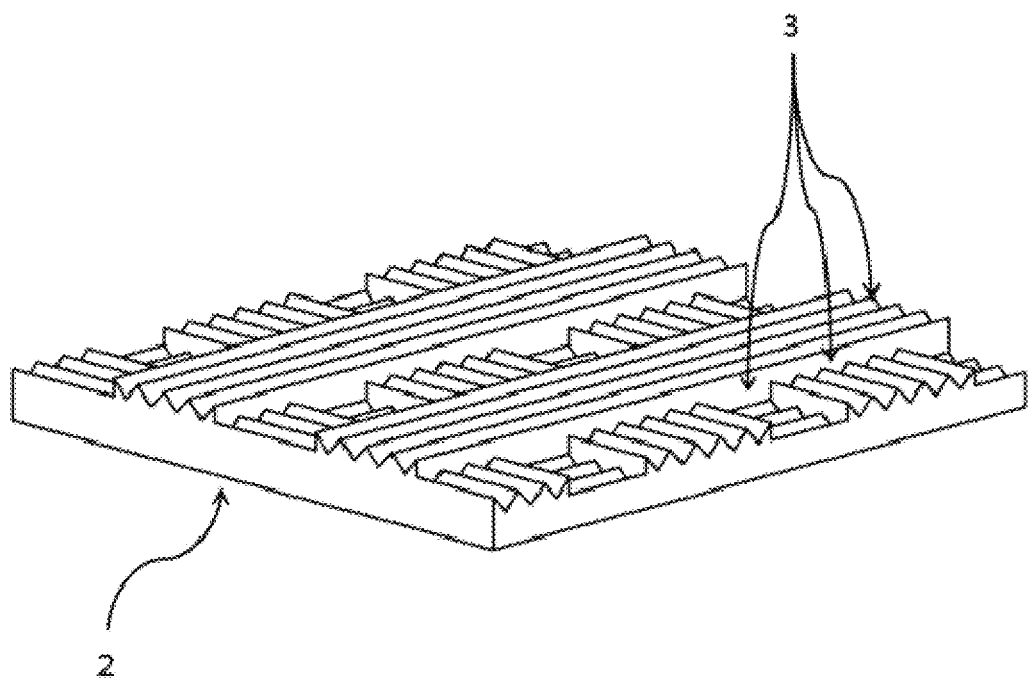
FIG. 9 illustrates plural sections whose convex portions are different in height from each other by two or more steps (levels)

As illustrated in FIG. 9, the molding 1 can have a structure such that the sections of the molding have two or more different levels. When such a molding is observed from outside while changing the viewing angle relative to the Z-axis rotation direction, an effect to cause delicate change of metallic appearance can be produced by the molding.

Similarly, it is preferable that the above-mentioned transparent portion of the molding, which has a shape such as characters, figures and signs, has the above-mentioned difference in height so that the above-mentioned interference problem is not caused in the production process and the transparent portion is securely formed. This production method also has an advantage for the reason mentioned above.

Figure 10A:
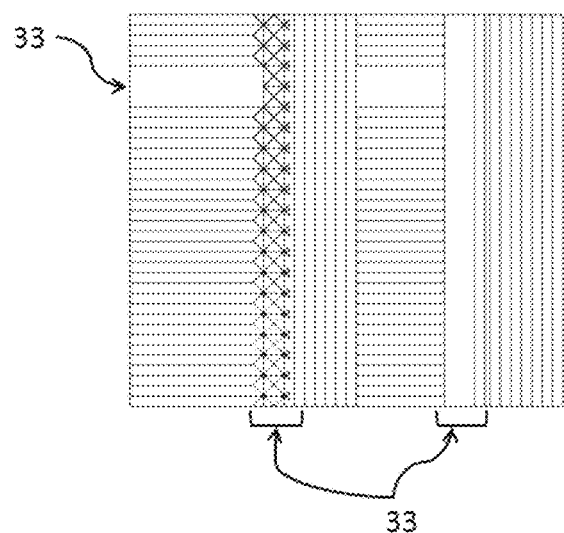
FIGS. 10A and 10B are a schematic plan view and a perspective view respectively, which illustrate examples of the interfacial portion between two adjacent sections.
Figure 10B:
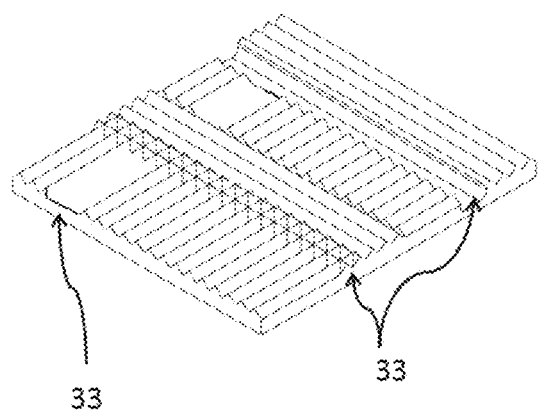

FIGS. 10A and 10B are schematic plan view and perspective view illustrating examples of the interfacial portion between two adjacent sections. As illustrated in FIGS. 10A and 10B, the interfacial portion may be an unclear interfacial portion 33 in which the structure of the convex portions is not clearly changed. Specific examples of such an unclear interfacial portion include portions in which ridge lines of convex portions cross to form four-sided pyramids; portions in which a flat portion is present; etc. It is often advantageous to productivity of the molding to form such an unclear interfacial portion. Even when such an unclear interfacial portion is present between sections, the effect of the present invention can be produced as long as each of the sections has a sufficient width.

The plural sections of the molding 1 can have a variety of shapes as long as the sections have the above-mentioned functions. However, the sections preferably have a structure in which a portion causing total reflection is arranged periodically. Specifically, the sections preferably have a structure including V-shaped grooves which have an angle of 90°.

Figure 11:
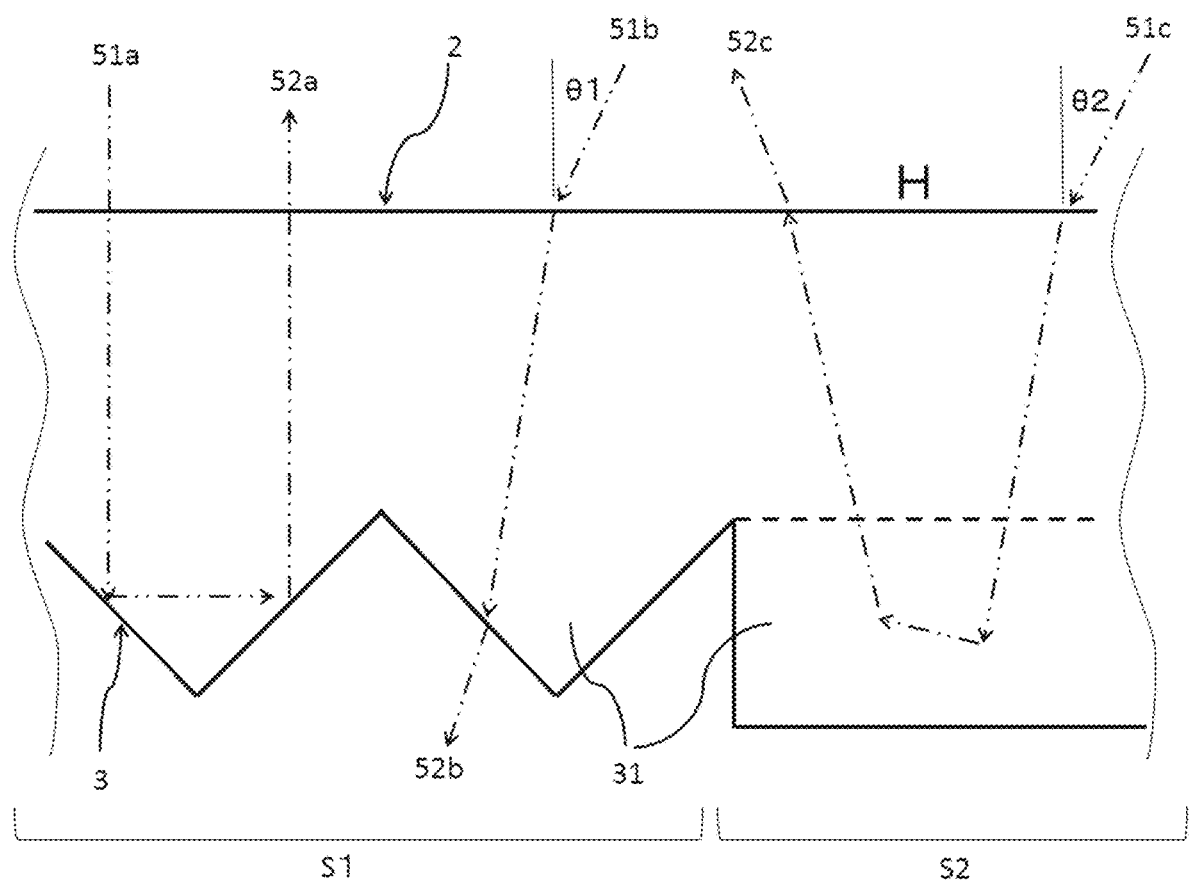
FIG. 11 is a cross-sectional view illustrating examples of a light beam passing through the decorative resin molding.

FIG. 11 is a cross-sectional view illustrating an example of the structure including V-shaped grooves having an angle of 90°. The function of the molding of the present invention will be described below by reference to FIG. 11. In this regard, for the purpose of description, a horizontal plane H is defined as a plane parallel to the smooth surface 21 of the plate-shaped portion of the molding 1, and an observer observes the molding 1 from above (i.e., from a direction substantially perpendicular to the horizontal surface H (i.e., the viewing angle and the lighting angle are substantially 90° relative to the horizontal plane H)). However, the geometric structure of the molding of the present invention is not limited thereto, and the molding can have any structure as long as the function mentioned above can be fulfilled.

FIG. 11 illustrates paths of light beams 51a, 51b and 51c entering from the horizontal plane H of the first and second sections S1 and S2. Characters θ1 and θ2 denote incidence angles of the light beams 51b and 51c. The incident angle of the light beam 51a is 0°. Characters 52a, 52b and 52c denote light beams exiting from the molding. It can be understood from FIG. 11 that the incidence angle range in which total reflection is caused is wider in convex portions in the ridge line direction, and the incidence angle range is different between the first and second sections S1 and S2. Specifically, in the first section S1, total reflection is caused when the incidence angle θ1 is not greater than about 10°, but in the second section S2, total reflection is caused when the incidence angle θ2 is not greater than about 45°. Thus, the second section S2 has a wider incidence angle range, in which total reflection is caused, than that of the first section S1.

When such a molding as illustrated in FIG. 11, in which the ridge line directions of the first and second sections are perpendicular to each other, is rotated at an angle of 90° along the horizontal plane H, the incidence angle ranges of the first and second sections in which total reflection is caused are changed to each other. Thus, by using the principle that the molding has sections having different total reflection incidence angle ranges, the effect of the present invention in which the metallic appearance of the molding changes when the viewing angle or the lighting angle is changed can be produced. In this regard, the total reflection is defined as follows.

Specifically, the total reflection is defined as a phenomenon such that when light incident on a slope of the molding at an angle θ greater than a critical angle θt, the incident light totally reflects from the slope, wherein the critical angle θt is defined by the following equation:

$$\theta t = \arcsin(n2/n1)[\text{rad}],$$

wherein n1 represents the refractive index of the resin constituting the molding, and n2 represents the refractive index of the material (such as air) surrounding the molding, wherein n1>n2.

In the molding 1 of the present invention, the size of the convex portion 31 is not limited as long as the effect of the present invention can be produced. For example, the pitch P of the convex portions (illustrated in FIG. 3) is not particularly limited as long as the convex portions satisfactorily reflects light, and is preferably from 10 μm to 200 μm, and more preferably from 20 μm to 100 μm. When the pitch P is not greater than 200 μm, an observer hardly recognizes the groove formed by the convex portions because the resolution power of human eyes is too low to recognize such a groove. In addition, when the pitch P is not greater than 100 μm, the effect can be produced more dominantly, namely, the molding 1 can have an appearance closer to metallic appearance. When the pitch P is not less than 10 μm, the convex portions and concave portions (i.e., grooves) can be clearly formed.

The size of the width of the section of the molding 1 is not particularly limited as long as the effect of the present invention can be produced. For example, it is preferable that the width W of the section is larger than one pitch P of the convex portion (i.e., W>P). Specifically, the width is preferably not smaller than 10 μm, and more preferably not smaller than 100 μm (i.e., 0.1 mm). In this case, the size is greater than the resolution power of human eyes, and therefore observers can easily recognize metallic patterns of the molding. Namely, by properly arranging the sections, observers can recognize the patterns while appearance of the patterns is changed when the viewing angle is changed.

The molding 1 of the present invention can have a structure in which a protective film or an antireflection film is set on at least one of the first surface 2 and the second surface 3.

The shape of the convex portion 31 is not particularly limited as long as the convex portion has a slope at which total reflection can be caused. Specifically, although the summits of the convex portion illustrated in FIGS. 3 and 5 have a cross section having a sharp shape such as triangle, the summits may be flat or curved (i.e., the cross section of the summits may have a trapezoidal shape, a curved shape, or the like). In this case, the highest portion or plane (i.e., the top of the convex portion) is considered to be the ridge line, wherein the highest portion or plane is sometimes referred to as a ridge portion or a ridge plane. In addition, in the molding illustrated in FIG. 11, adjacent convex portions 31 have no space therebetween, but a space may be formed between adjacent convex portions. For example, a transparent portion through which light passes (such as a portion unintentionally formed by mistake in a production process) or a flat portion which is intentionally formed and by which a desired reflective index is imparted to the portion so that the portion can have metallic appearance can be present between adjacent convex portions. In this regard, the width of such a portion is preferably not longer than the pitch P, preferably not larger than 0.1 mm, so that the section including the portion can have an optical transparency of not greater than 50% (i.e., the molding can have metallic appearance). When the width of such a transparent portion is larger than the width (0.1 mm), the portion can be recognized by observers. In this case, it is preferable to form a pattern (such as characters) on the transparent portion as mentioned above.

As mentioned above, the molding of the present invention has metallic appearance which is imparted to the molding by an area including the convex portions. When the area has a shape such as characters, figures, signs, pictures, and designs (i.e., the patterns mentioned above), the molding can exhibit the patterns. In addition, it is needless to say that by forming a flat portion, which has no convex portion while having a pattern shape, in an area of the molding including the convex portions, the flat portion can be recognized by observers as a white pattern (such as reversed characters).

Having generally described this invention, further understanding can be obtained by reference to certain specific examples which are provided herein for the purpose of illustration only and are not intended to be limiting.

EXAMPLES

A molding having an acrylic plate which has a thickness of 0.8 mm and which has two flat surfaces (first and second surfaces) was formed using an injection molding method, wherein a first section which has a width of 1 mm and which includes convex portions whose ridge lines extend in a first direction and a second section which also has a width of 1 mm and which includes convex portions whose ridge lines extend in a second direction perpendicular to the first direction are alternately arranged side by side on the second surfaces, wherein the height of each convex portion is 0.025 mm, the pitch P of adjacent convex portions is 0.05 mm, and the angle of the V-grooves formed by adjacent convex portions is 90°, and wherein the difference in level between the first sections and the second sections is equal to the height (i.e., 0.025 mm) of the convex portions.

It was confirmed that the molding has metallic appearance (stripe metallic patterns) when the molding is observed using visible light, wherein the stripe metallic patterns appear or disappear when the viewing angle is changed. It was also confirmed that by forming plural flat (and smooth) areas (i.e., areas having no convex portions) on the second surface, the molding can show figures or outline patterns which are formed by the areas. Further, it was also confirmed that even when the bottommost portions of the V-grooves formed by adjacent convex portions are curved so as to have a curvature (R) of 5 μm due to deterioration of transfer of the grooves from the die in the molding process, the same effect can be produced.

In addition, the above-mentioned procedure for preparation and evaluation of the molding was repeated except that the acrylic resin was changed to a cycloolefin polymer (COP), an acrylonitrile-styrene copolymer (AS), or a polypropylene (PP). It was confirmed that the resultant moldings can produce the same effects. Further, when the above-mentioned procedure for preparation and evaluation of the molding was repeated except that the acrylic resin was changed to a colored (such as red or blue) and semitransparent resin, the resultant moldings could produce the same effect.

Another molding having an acrylic plate which has a thickness of 1 mm and which has two flat surfaces (first and second surfaces) was formed using an injection molding method, wherein a first section which has a width of 0.25 mm and which includes convex portions whose ridge lines extends in a first direction and a second section which also has a width of 0.25 mm and which includes convex portions whose ridge lines extend in a second direction perpendicular to the first direction are alternately arranged side by side on the second surfaces, wherein the height of each convex portion is 0.025 mm, the pitch P of two adjacent convex portions is 0.05 mm and the angle of the V-grooves formed by the adjacent convex portions is 90°, and wherein the difference in level between the first sections and the second sections is equal to the height (i.e., 0.025 mm) of the convex portions. It was confirmed that the resultant molding can show such a pattern of origami bird (crane) as illustrated in FIG. 12A, wherein the pattern of origami bird changes to such a figure as illustrated in FIG. 12B or FIG. 12C (i.e., the angle formed by the wings of the bird changes) when the viewing angle is changed relative to the Z-axis direction. Namely, it was confirmed that the molding can produce the effect of the present invention. The contrast between a light portion of the pattern of origami bird and a dark portion thereof (i.e., the ratio of the brightness of the light portion of the pattern to that of the dark portion) was about 10:1 in FIG. 12A or 12C while the contrast of the pattern in the middle of rotation of the molding at an angle of 90° (i.e., the contrast of the pattern illustrated in FIG. 12B) was about 3:2.

Yet another molding having a polycarbonate (PC) plate which has a thickness of 3 mm and which has two flat surfaces (first and second surfaces) was formed using an injection molding method. In an area of the second surface, which has an outline similar to a coast line, a combination of three types of sections each of which has a width of 0.5 mm and each of which has a diamond pattern was alternately formed in such a manner that the direction of the ridge lines of the convex portions of the three types of sections changes at an angle of ±60° to form a diamond pattern. It was confirmed that the resultant molding can show a metallic jewel (diamond) pattern, which changes the shape thereof when the viewing angle changes.

Thus, it was confirmed that the effect of the present invention can be produced by the above-mentioned resin molding examples, which were really prepared.

INDUSTRIAL AVAILABILITY OF THE PRESENT INVENTION

The decorative resin molding of the present invention and the method for producing the molding have good industrial availability.

EFFECT OF THE PRESENT INVENTION

The present invention produces a new effect to provide a decorative resin molding which can be produced without complicating the production process while preventing increase of production costs and which can produce an effect such that observers can recognize decorative metallic patterns on the molding, which patterns change when the viewing angle or the lighting angle is changed, wherein the effect cannot be produced by metal plating.

What is claimed is:

1. A resin molding, comprising:
a plate-shaped portion having a first section and a second section adjacent to the first section, the plate-shaped portion made of optically transparent resin, the plate-shaped portion including
a first surface on which light is incident from outside, the first surface configured to be observed by an observer, the first surface being flat across the first section and the second section, and
a second surface located opposite to the first surface, the second surface including
a plurality of first convex portions each having a ridge line extending in a first direction only inside the first section, the first convex portions each having a first slope surface and a second slope surface, the first convex portions each having a triangular cross-section in a plane orthogonal to the first direction, and
a plurality of second convex portions each having a ridge line extending in a second direction only inside the second section, the second direction being different from the first direction such that the first section has a critical angle different from the second section, the critical angle being an angle that the light incident on the first surface and passing through the plate-shaped portion is totally reflected at the second surface, the second convex portions each having a third slope surface and a fourth slope surface, the second convex portions each having a triangular cross-section in a plane orthogonal to the second direction,
wherein the first slope surface and the second, slope surface are disposed such that light incident perpendicularly to the first surface in the first section is totally reflected at the first slope surface, then the reflected light is totally reflected at the second slope surface to perpendicularly exit from the first surface toward outside, and
the third slope surface and the fourth slope surface are disposed such that light incident perpendicularly to the first surface in the first section is totally reflected at the third slope surface, then the reflected light, is totally reflected at the fourth slope surface to perpendicularly exit from the first surface toward outside
wherein the first convex portions and the second convex portions each have a pitch in a range between 10 μm and 200 μm.

2. The resin molding according to claim 1, wherein the first convex portions have the ridge line having a different height from the second convex portions.

3. The resin molding according to claim 1, wherein a valley defined between the adjacent second convex portions in the second section is located higher than a height of the first convex portions in the first section.

4. The resin molding according to claim 1, wherein the first section and the second section each has a width not smaller than 0.1 mm.

5. The resin molding according to claim 2, wherein
a valley defined between the adjacent second convex portions in the second section is located higher than a height of the first convex portions in the first section.

6. The resin molding according to claim 2, wherein
the first section and the second section each has a width not smaller than 0.1 mm.

7. The resin molding according to claim 3, wherein
the first section and the second section each has a width not smaller than 0.1 mm.

8. A resin molding, comprising:
a plate-shaped portion having a first section and a second section adjacent to the first section, the plate-shaped portion made of optically transparent resin, the plate-shaped portion including
a first surface on which light is incident from outside, the first surface being flat across the first section and the second section, and
a second surface located opposite to the first surface, the second surface including
a plurality of first convex portions each having a ridge line extending in a first direction only inside the first section, and
a plurality of second convex portions each having a ridge line extending in a second direction only inside the second section, the second direction being different from the first direction such that the first section has a critical angle different from the second section, the critical angle being an angle that the light incident on the first surface and passing through the plate-shaped portion is totally reflected at the second surface,
wherein the first convex portions and the second convex portions each have a pitch in a range between 10 μm and 200 μm.

* * * * *